United States Patent [19]

Otobe et al.

[11] Patent Number: 4,636,957
[45] Date of Patent: Jan. 13, 1987

[54] METHOD FOR CONTROLLING OPERATING STATE OF AN INTERNAL COMBUSTION ENGINE WITH AN OVERSHOOT PREVENTING FUNCTION

[75] Inventors: Yutaka Otobe, Shiki; Noriyuki Kishi, Tokyo, both of Japan

[73] Assignee: Honda Giken Kogyo Kabushiki Kaisha, Tokyo, Japan

[21] Appl. No.: 622,822

[22] Filed: Jun. 21, 1984

[30] Foreign Application Priority Data

Jun. 22, 1983 [JP] Japan ............................ 58-113589

[51] Int. Cl.$^4$ ............................................ F02M 51/00
[52] U.S. Cl. ............................ 364/431.07; 123/492; 364/431.06
[58] Field of Search ................... 364/431.03, 431.06, 364/431.07; 123/492, 480, 571

[56] References Cited

U.S. PATENT DOCUMENTS

| | | | |
|---|---|---|---|
| 4,359,993 | 11/1982 | Carlson | 123/492 |
| 4,416,237 | 11/1983 | Aoki et al. | 123/492 |
| 4,424,568 | 1/1984 | Nishimura et al. | 364/431.07 |
| 4,434,769 | 3/1984 | Otobe et al. | 123/492 |
| 4,454,854 | 6/1984 | Gotoh et al. | 364/431.06 |
| 4,469,072 | 9/1984 | Kobayashi et al. | 123/491 |
| 4,490,792 | 12/1984 | Deutsch et al. | 364/431.07 |
| 4,502,448 | 3/1985 | Otobe | 123/480 |

*Primary Examiner*—Parshotam S. Lall
*Attorney, Agent, or Firm*—Pollock, VandeSande & Priddy

[57] ABSTRACT

A method for controlling an operating state of an internal combustion engine by varying the amount of the fuel according to the pressure level in the intake air passage downstream of the throttle valve, comprises a step for sampling a signal of the pressure level in the intake air passage, a step for correcting the sampled value by adding a value corresponding to a difference between a latest sampled value and a preceding sampled value, to the latest sampled value, and a step for controlling the fuel supply amount according to the corrected value. The method further includes a step for controlling the level of the corrected value to a predetermined value when the level of the corrected value is becoming greater than the predetermined value, to prevent the generation of an overshoot in the corrected value which might cause an adverse affect on the air/fuel ratio control.

5 Claims, 4 Drawing Figures

METHOD FOR CONTROLLING OPERATING STATE OF AN INTERNAL COMBUSTION ENGINE WITH AN OVERSHOOT PREVENTING FUNCTION

BACKGROUND OF THE INVENTION

1. Field of the Invention

The present invention relates to a method for controlling operating state of an internal combustion engine.

2. Description of Background Information

There are well known control methods in which various parameters of the engine operation are detected and the operating state of the multi cylinder internal combustion engine is controlled through a calculation of an optimum amount of the fuel supply for the engine operation of the moment, according to detected output signals of the parameters.

As an example of the control method of this type, the present applicant has already proposed, in Japanese patent Application No. 57-055890, a method in which major parameters of the engine operation are continuously detected by sensors, and sampled in accordance with a TDC (Top Dead Center) signal which is synchronized with the rotation of the engine crankshaft. The fuel supply amount is determined in accordance with a corrected value of the sampled value which is obtained by adding a latest sampled value to a value responsive to the difference between the latest sampled value and a preceding sampled value.

In such a control method as described above, a vacuum level in an intake air passage of the engine is detected as a major parameter of the engine operation, for instance, by means of an absolute pressure sensor.

However, in the conventional control method in which the sampled values of the sensor output signals are corrected in such a manner as described above, a drawback was that an overshoot (excessive increase) of the corrected value of the latest sampled value tends to appear, especially when the operating condition of the engine is changed very rapidly, for example, at a full throttle operation of the engine. If such an overshoot of the corrected value occurs, the fuel supply amount will be excessively increased, which in turn will result in an adverse effect to the air/fuel ratio control, such as the supply of an overrich mixture to the engine.

For other devices to be operated by a calculated control signal such as the exhaust gas recirculation amount, there are no problems if the corrected value of the sensor output signal is not used, due to rather slow response characteristics of those devices.

SUMMARY OF THE INVENTION

An object of the invention is therefore to provide a method for controlling an operating condition of an internal combustion engine, in which the generation of the overshoot of the corrected value of the sampled value of a major parameter of the engine operation is prevented to improve the performance of the engine operation.

According to the present invention, the control method is characterized in that the corrected value of the sampled value is controlled within a predetermined value when the corrected value of the sampled parameter becomes greater than the predetermined value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

Figure 1:
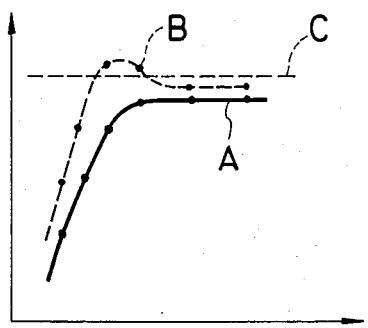
FIG. 1 is a graph showing the manner of variation of the sample value and the corrected value in the case of a conventional control method.

Before entering into the explanation of the preferred embodiment, the relationship between the sample value of the absolute value of the vacuum in the intake air passage and the corrected value of the sampled value will be explained, by way of example, with reference to FIG. 1.

Under a condition of the engine operation in which the throttle valve is rapidly opened to a fully opened position, the vacuum in the intake air passage is reduced very rapidly, then the vacuum level is stabilized at a value around the atmospheric pressure. The sampled value of the vacuum level under this condition varies in a manner such as shown by the solid line A of FIG. 1. Since the magnitude of the correction of the sampled value increases as the difference between the latest sampled value and the preceding sampled value increases, the corrected value shows a very rapid change which is greater than the change in the sampled value. Further, as shown by the dashed line B of FIG. 1, the corrected value may exceeds a level C corresponding to the atmospheric pressure, as an overshoot. As this overshoot is not originally present, if the fuel supply amount is controlled in accordance with this corrected value, that will cause an adverse effect on the air/fuel ratio control as mentioned before.

Figure 2:
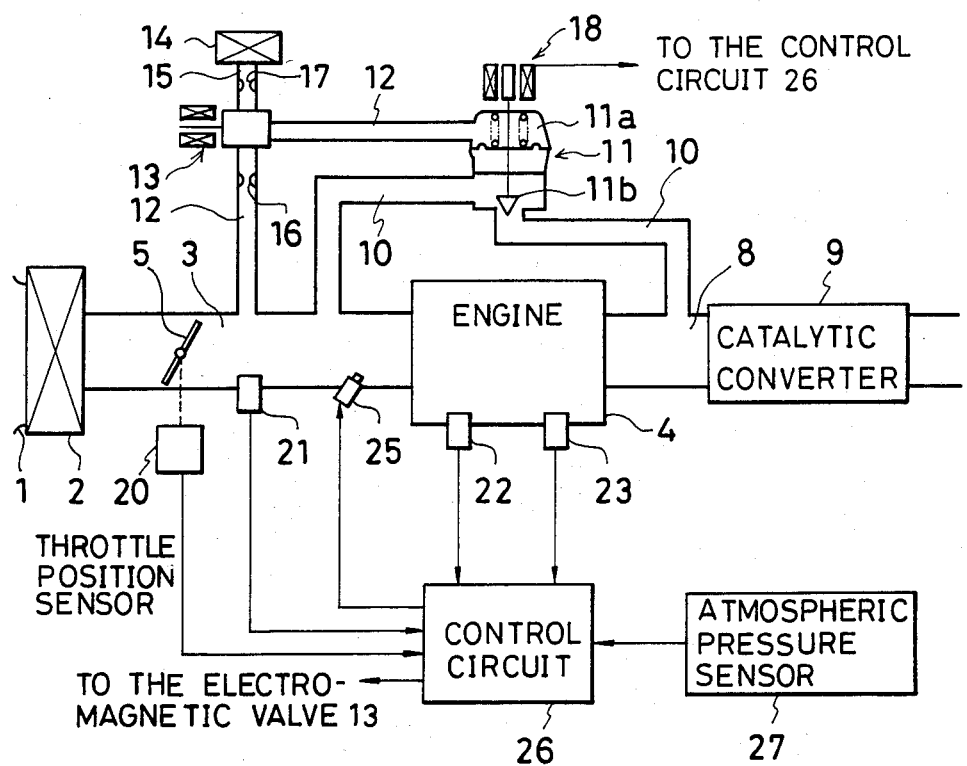
FIG. 2 is a block diagram of an electronically controlled fuel supply system to which the control method of the operating condition of the engine is applied.

The schematic diagram of FIG. 2 shows an example of an electronically controlled fuel supply system of an internal combustion engine, in which the method according to the present invention may suitably be utilized. The intake air taken at an atmospheric air inlet port 1 is supplied to an engine 4 via an air cleaner 2 and an intake air passage 3. A throttle valve 5 is disposed in the intake air passage 3 and the amount of the fuel supplied to the engine is controlled in accordance with the opening degree of the throttle valve 5. In an exhaust passage 8 of the engine 4, there is disposed a three-way catalytic converter 9 for reducing the harmful components such as CO, HC, and NOx contained in the exhaust gas of the engine. An EGR (Exhaust Gas Recirculation) passage 10 is provided for the communication from the exhaust gas passage 8 to the intake air passage 3. The amount of the exhaust gas flowing through the EGR passage 10 is controlled by an EGR valve 11 disposed in the EGR passage 10. The opening degree of the EGR valve 11 is controlled by means of a valve element 11b according to the magnitude of pressure applied to a pressure chamber 11a thereof. The pressure chamber 11a of the EGR valve 11 is communicated with a part of the intake air passage 3, downstream of the throttle valve 5 via a pressure passage 12. The pressure passage 12 is provided with a three way electromagnetic valve 13 which, when inactivated, completes communication through the pressure passage 12. When activated, the three way electromagnetic valve 13 closes the pressure passage 12, on the side of the downstream of the throttle valve 5, and at the same time, completes communication between the pressure chamber 11a and an atmospheric air inlet port 14 via a pressure passage 15. An orifice 16 is provided in the pressure passage 12 on the side of the downstream of the throttle valve 5 from the three way electromagnetic valve 13. Similarly, an orifice 17 is provided in the pressure passage 15. Further, for detecting the amount of the lift of the valve element 11b of the EGR valve 11, a lift sensor 18 is connected to the valve element 11b to provide an output signal to a control circuit 26.

The control circuit 26 is further applied with signals from various sensors such as a throttle position sensor 20, an absolute pressure sensor 21, an engine coolant temperature sensor 22, and crank angle sensor 23. The throttle position sensor 20, for example, takes the form of a potentiometer and produces a voltage signal whose voltage level is responsive to the opening degree of the throttle valve 5. The absolute pressure sensor 21 is provided in the intake air passage 3 downstream of the throttle valve 5, and also produces a voltage signal whose level is responsive to the pressure level in the intake air passage 3. The engine coolant temperature sensor produces a voltage signal whose level is responsive to the temperature of the engine coolant. The crank angle sensor 23 produces a pulse signal when a crankshaft of the engine 4 is at a predetermined angular position before each actual top dead center between exhaust and intake strokes. A fuel injector 25 is provided in the intake air passage, adjacent to each inlet valve of the engine 4. The control circuit 26 receives the output signals of the above sensors and produces drive signals for the three way electromagnetic valve 13 and the fuel injector 25. Further, the control circuit 26 receives an output signal of an atmospheric pressure sensor 27 which detects the pressure of the atmosphere.

Figure 3:
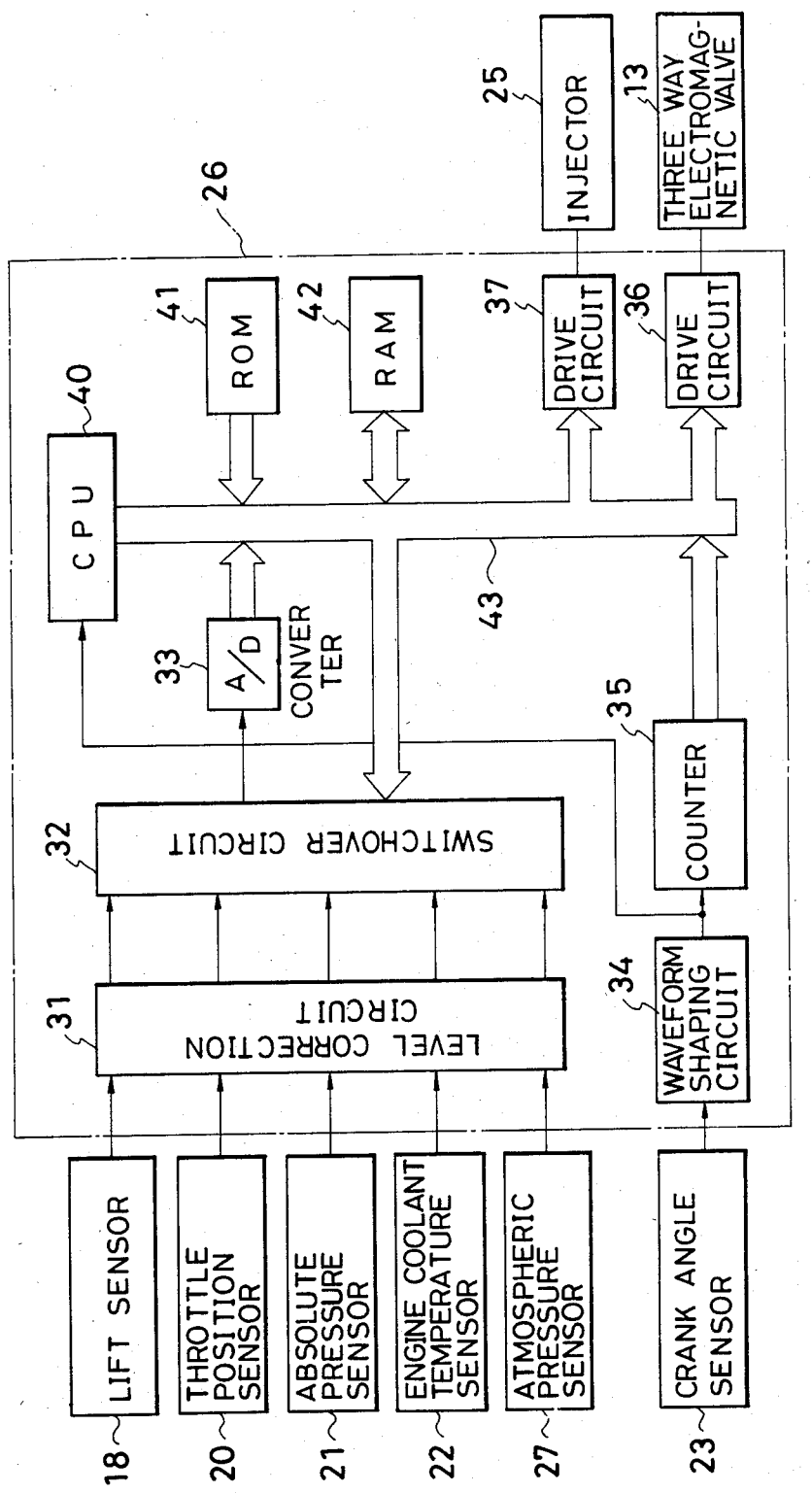
FIG. 3 is a block diagram showing the structure of the control circuit of the system of FIG. 2.

Referring to FIG. 3, the construction of the control circuit 26 will be further explained. The control circuit 26 includes a level correction circuit 31 which adjusts the level of the output signals of the lift sensor 18, the throttle position sensor 20, the absolute pressure sensor 21, the engine coolant temperature sensor 22, and the atmospheric pressure sensor 27. The output signals of the above sensors whose level is corrected in the level correction circuit 31 are then applied to an input signal switchover circuit 32. An analog output signal produced from the input signal switchover circuit 32 is then applied to an A/D (Analog to Digital) converter 33. The control circuit 26 further includes a waveform shaping circuit 34 for the waveform shaping of the output signal of the crank angle sensor 23 and produces a TDC (Top Dead Center) signal, and a counter 35 for counting the interval of each pulse of the TDC signal from the waveform shaping circuit 34. For the driving of the three way electromagnetic valve 13 and the fuel injector 25, drive circuits 36 and 37 are provided in the control circuit 26. A CPU (Central Processing Unit) 40 is provided for the digital calculation according to a predetermined program, and a ROM (Read Only Memory) 41 for storing various process programs and data and a RAM (Random Access Memory) 42 are also provided. The input signal switchover circuit 32, the A/D converter 33, the counter 35, the drive circuits 36 and 37, the CPU 40, the ROM 41, and the RAM 42 are connected with each other by means of an input/output bus 43. The TDC signal from the waveform shaping circuit 34 is applied to the CPU 40 to start the calculation based on a TDC signal interruption. In addition to the programs for the operation of the CPU 40, the ROM stores data of a fundamental fuel injection time duration for the operation of a fuel injector 25 corresponding to a fundamental value of the amount of the fuel to be supplied to the engine 4, which is read in response to the absolute value of the pressure of the intake air and the engine speed, and data of a fundamental EGR amount which is also read in response to the absolute pressure of the intake air and the engine speed, in the form of data maps.

The operation of the control circuit 26 will be explained hereinafter. Information relating to the opening degree of the EGR valve 11, the opening degree of the throttle valve 5, the pressure of the intake air, the engine coolant temperature, and the atmospheric pressure, is selectively supplied from the A/D converter 33 to the CPU 40 via the input/output bus 43 and the information of the engine speed from the counter 35 is also supplied to the CPU 40 via the input/output bus 43. In accordance with a predetermined operation program, the CPU 40 reads the above information, and calculates the fuel injection time duration of the injector 25 from the above data map and a predetermined calculation formula and the EGR amount in synchronism with the TDC signal on the basis of the above information. Accordingly, the engine 4 is supplied with the fuel by the fuel injector 25 which is actuated by the drive circuit 37 for the fuel injection time duration calculated in the above process, and at the same time, the three way electromagnetic valve 13 is actuated by the drive circuit 36 to vary the pressure value in the pressure chamber 11a of the EGR valve 11. The duty control of the magnetic value 13 for controlling the opening degree of the EGR valve 11 is performed.

Figure 4:
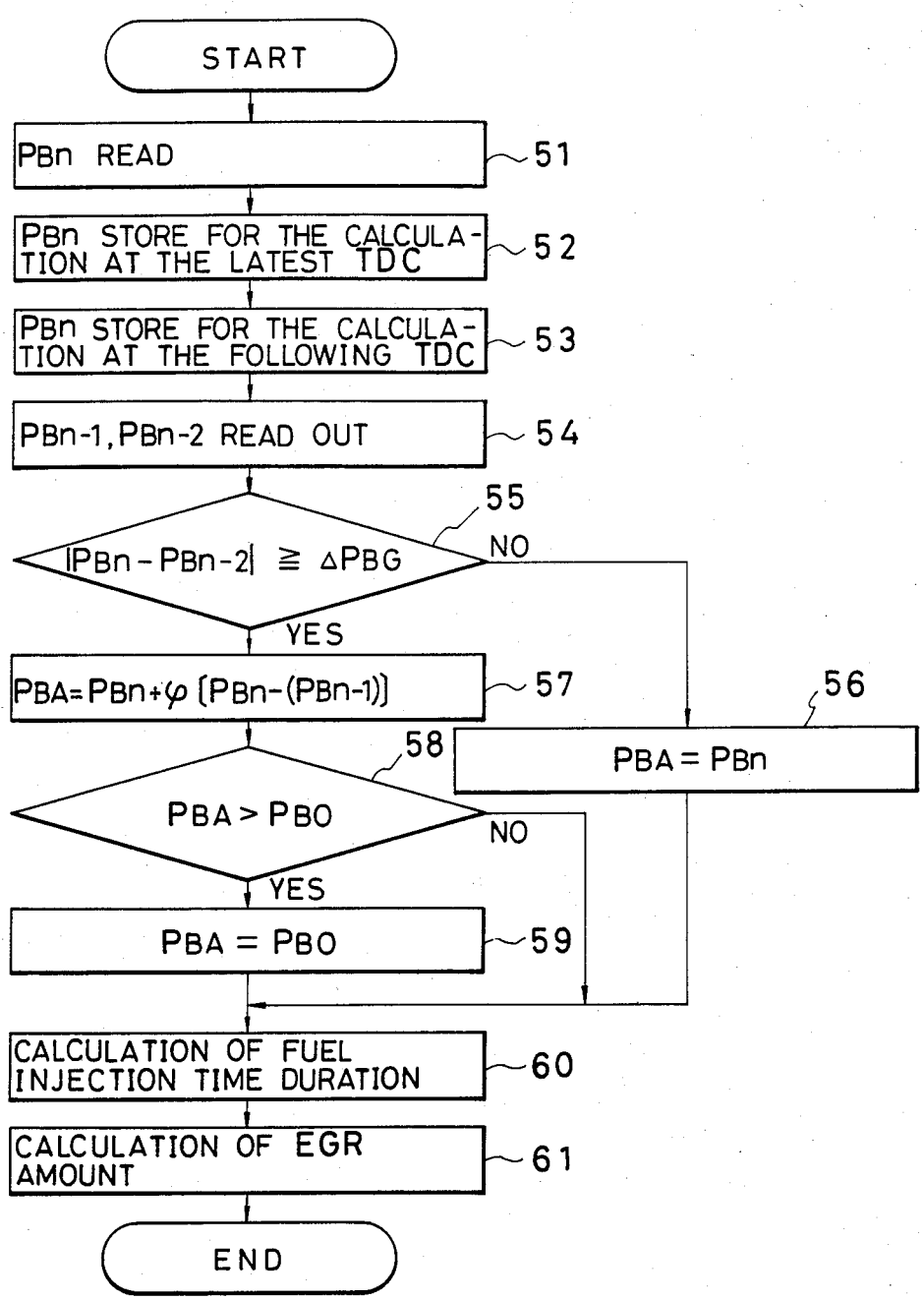
FIG. 4 is a flowchart of the operation of the control circuit, illustrating an embodiment of the control method of the present invention.

Turning to the flow chart of FIG. 4, the order of operations of the control method according to the present invention, which is performed by the control circuit 26, will be further explained.

In this method, the by the operation of the CPU 40, the absolute value of the intake air pressure is sampled from the A/D converter 33 in synchronism with the TDC signal, as a sampled value $P_{Bn}$ of intake air absolute pressure at a step 51. The sampled value $P_{Bn}$ is then stored in the RAM 42 for the calculation at the time of the latest pulse of the TDC signal at a step 52, and also for the calculation at the time of the following two of the TDC signals at a step 53. After these operations, the CPU 40 reads a preceding sampled value $P_{Bn-1}$ and a further preceding sampled value $P_{Bn-2}$ from the RAM 42 at a step 54, and determines whether or not an absolute value $|P_{Bn}-P_{Bn-2}|$ of the difference between the latest sampled value $P_{Bn}$ and the further preceding sampled value $P_{Bn-2}$ is greater than a value including a predetermined shift amount $\Delta P_{BG}$ at a step 55. If $|P_{Bn}-P_{Bn-2}| < \Delta P_{BG}$, the CPU 40 selects the latest sampled value $P_{Bn}$ as a corrected pressure value $P_{BA}$ at a step 56. On the other hand, if $|P_{Bn}-P_{Bn-2}| \geq \Delta P_{BG}$, the CPU 40 calculates the correction value $P_{BA}$ by a calculation process of multiplying a constant $\phi$ to a difference between the latest sampled value $P_{Bn}$ and the preceding sampled value $P_{Bn-1}$, and adding the latest sampled value $P_{Bn}$ to that product, at a step 57. Therefore, the corrected pressure value of this case can be expressed as: $P_{BA}=P_{Bn}+\phi(P_{Bn}-P_{Bn-1})$. Then the CPU 40 discriminates whether or not the corrected pressure value $P_{BA}$ calculated at the step 57 is greater than a predetermined value $P_{BO}$ at a step 58. If $P_{BA}>P_{BO}$, the correction value $P_{BA}$ is made equal to the predetermined value $P_{BO}$ at a step 59, as the correction value $P_{BA}$ is outside the area of the existence of the sampled value. If, on the other hand, $P_{BA} \leq P_{BO}$, the corrected pressure value PBA calculated at the step 57 will be used as it is. Then, a desired fundamental fuel injection time duration is looked up from the data map in the ROM 41 according to the engine speed information and the corrected pressure value $P_{BA}$ calculated or established at the step 56, 57 or 59. The fuel injection time duration for actuating the fuel injector is calculated by correcting the fundamental fuel injection time duration in accordance with such information as to the engine coolant temperature, the throttle valve opening degree, and the atmospheric pressure at a step 60. At the same time, a desired fundamental EGR amount is looked up from the data map stored in the ROM 41 in the form of the desired EGR valve lift values according to the latest sampled value $P_{Bn}$ and the engine speed information. Then the desired EGR valve lift value is calculated by correcting the fundamental EGR amount in accordance with such information as to the atmospheric pressure, the opening degree of the EGR valve, and the opening degree of the throttle valve at a step 61. Further, at the same time, other control parameters obtainable from the absolute value of the intake air pressure other than the fuel injection time duration are calculated according to the latest sampled value $P_{Bn}$ at this step 61. By performing the process of these steps repeatedly, the operating state of the engine is controlled. It should be noted that the predetermined value $P_{BO}$ corresponds to the sampled value of the atmospheric pressure. However, a value obtained by subtracting from the sampled value of the atmospheric pressure a component of pressure drop due to the friction of the intake air in a part of the intake air passage from the air cleaner 2 to the position of the absolute pressure sensor 21 can be used instead of the above predetermined value $P_{BO}$.

It will be appreciated from the foregoing that according to the method of the present invention the corrected value of the absolute value of the intake air pressure is made equal to the predetermined value when the corrected value becomes greater than the predetermined value. Therefore, the fuel injection amount is maintained at a proper level even during the operating state of the engine in which the corrected value of the detection value of the pressure in the intake air passage becomes greater than the atmospheric pressure level due to an abrupt change in the pressure in the intake air passage. Thus, the magnitude of the control parameter of the engine such as the fuel supply amount and the amount of EGR are maintained within an appropriate level to improve the engine performance.

What is claimed is:

1. A method for controlling an operating state of an internal combustion engine having an intake air passage with a throttle valve, comprising:
   detection step for detecting a pressure in the intake air passage of the engine downstream of the throttle valve and producing a pressure signal;
   calculation step for calculating a difference between a latest sampled value of said pressure signal and a preceding sampled value of said pressure signal, and adding a value corresponding to said difference to said latest sampled value to produce a corrected pressure value; and
   controlling step for controlling an amount of fuel to be supplied to the engine on the basis of said corrected pressure value, wherein said corrected pressure value is made equal to a predetermined value when said corrected pressure value becomes greater than said predetermined value.

2. A method as set forth in claim 1, wherein said predetermined value is determined in accordance with an atmospheric pressure.

3. A method as set forth in claim 1, wherein said value corresponding to said difference is a value calculated by a multiplication between a constant and said difference.

4. A method as set forth in claim 1, further comprising a step for determining an amount for controlling an operating state of the engine according to said sampled value of said pressure signal.

5. A method as set forth in claim 4, wherein said amount for controlling an operating state of the engine is an amount of exhaust gas recirculation of the engine.

* * * * *